United States Patent Office
3,813,328
Patented May 28, 1974

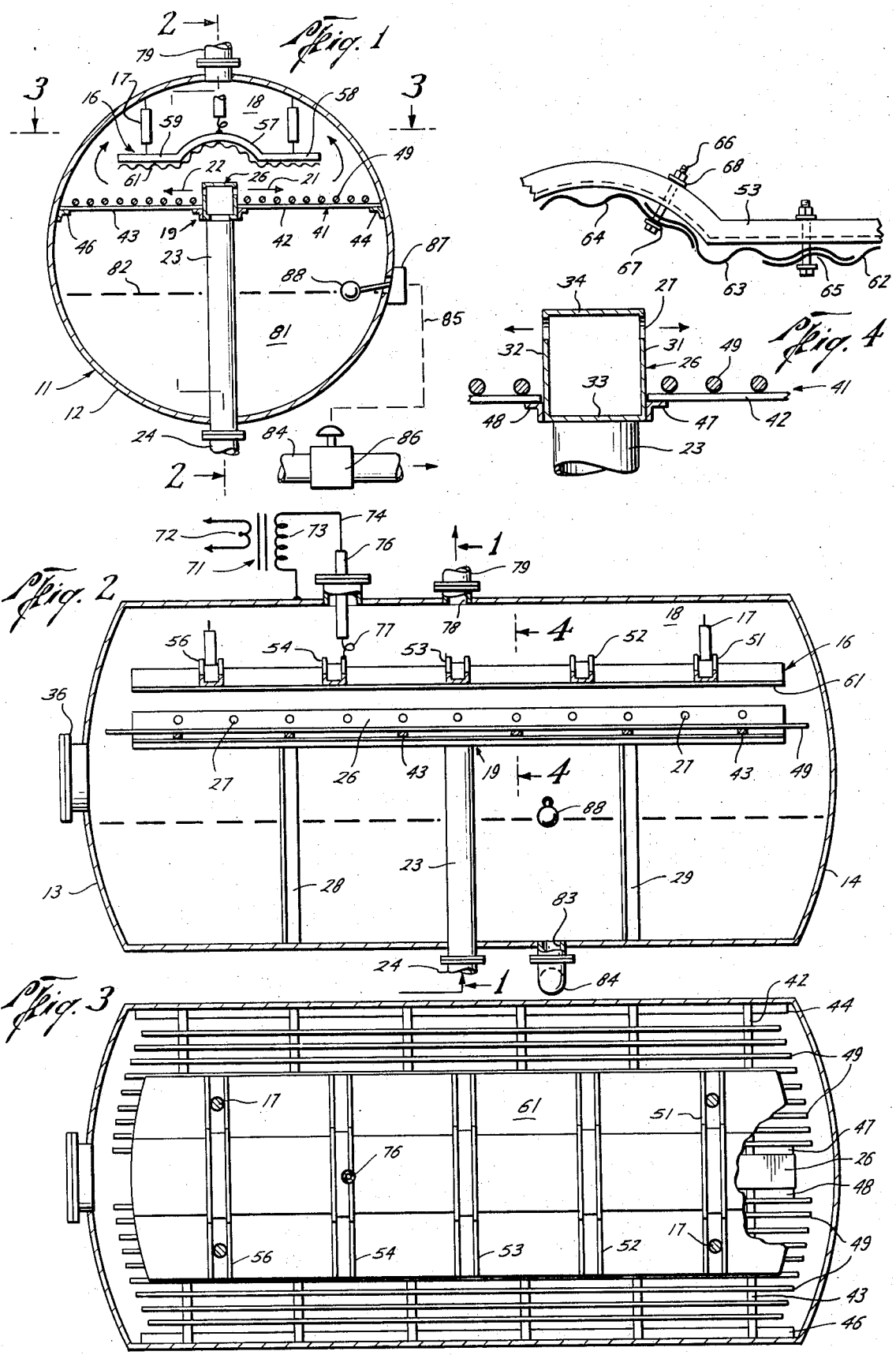

3,813,328
ELECTRIC TREATER
Delber W. Turner, Houston, Tex., assignor to Petrolite Corporation, St. Louis, Mo.
Filed Oct. 27, 1972, Ser. No. 301,562
Int. Cl. B03c 5/02
U.S. Cl. 204—302
19 Claims

ABSTRACT OF THE DISCLOSURE

An electric treater for resolving water-in-oil emulsion including a closed horizontally elongated vessel containing an electrical field defined by horizontally-disposed, upper imperforate (energized) and lower foraminous (grounded) electrodes. An inlet distributor directs emulsion flows laterally beneath the imperforate electrode and toward each sidewall of the vessel. Treated oil is removed from above the imperforate electrode and coalesced water from a body of water maintained below the foraminous electrode. The imperforate electrode is formed of transverse rigid ribs having straight and arcuate sections and long pieces of thin metal (corrugated) sheeting integrally secured into a monocoque electrode structure being lightweight but highly resistant to torsional and longitudinal bending forces.

BACKGROUND OF THE INVENTION

(1) Field of the invention

This invention relates to the separation of oil-continuous emulsions containing a dispersed water phase, and in particular, to an electric treater for resolving water-in-oil emulsions.

(2) Description of the prior art

Electric treaters have been employed to resolve water-in-oil emulsions with high potential electric fields for over sixty years. The electric treaters contain electrodes, which are energized to high potentials, to define an electric field for resolving the emulsions. The emulsions may be formed in natural environment or synthetically by dispersing water into a continuous oil phase. For example, the emulsions may be crude oil containing dispersed water in well production fluids. The emulsions may result from the deliberate intermixing of fresh water into crude oil for carrying out a process which is denoted as desalting in a refinery. In either event, the function of the electric field is to resolve the emulsion into a treated oil (dehydrated) phase and a separated water (coalesced) phase.

Usually, the continuous oil phase has a lower specific gravity, a relatively higher resistivity and a lower dielectric constant than the dispersed water phase. Subjecting the emulsions to an electric field promotes the gravitational separation of the oil and water phases by induced coalescence of the dispersed water droplets. Where the oil phase is a substance like crude oil, the electric field is usually created by applying high-voltage, AC potentials to spaced-apart electrodes. The electric field can be provided by potentials between 5 and 75 kilovolts. The spacing between the energized electrodes, and adjacent metal objects, usually produces an electrical gradient of between 0.5 and 8 kilovolts per inch in the resultant electric field.

Electric treaters have been categorized into two hydraulic fluid-flow categories. The electric treater may have fluids passing vertically through foraminous electrodes defining the electric field. The treated oil phase is removed as an overhead flow and the coalesced water phase is removed as an underflow from the electric treater. The other type of electric treater employs horizontal flow of the emulsion within the electric field. The treated oil flows from the electric field to a treated oil outlet and coalesced water accumulates in the lower portion of the electric treater. Coalesced water is removed from the electric treater in a regulated withdrawal for maintaining a desired oil-water interface. The present invention is an improvement to the horizontal-flow type of electric treaters.

In general, early designs of horizontal-flow electric treaters employed special distributors for passing the emulsion through an electric field at relatively high rates of flow, e.g., at velocities of 15 feet per second. Horizontal electrodes above and below the horizontal flow of emulsion defined the electric field which resulted in the rapid resolution of the emulsion into a treated oil phase and a coalesced water phase. This type of electric treater could resolve large amounts of difficult-to-treat emulsions in a relatively small vessel capacity with a minimum of electrical field shorting effects due to "chaining" or water-string arcs. The high flow velocities in these electric treaters required substantially rigid electrode configurations. Usually, the lower electrode was foraminous and in most cases could be grounded to the vessel forming the electric treater. In other applications, the lower foraminous electrode could be energized. In either event, the lower foraminous electrode provided the lower horizontal boundary of the electric field. The upper electrode could be foraminous to provide a recirculating treated oil phase into the fluid flow between the electrodes. Other horizontal-flow electric treaters employed an upper energized horizontal electrode which also carried an imperforate metal plate insulated from the metal vessel. A relatively complex energized electrode construction resulted since the electrode, imperforate plate and supporting members had to be made sufficiently rigid to resist flexing within the high velocity horizontal flows in the electric treater.

A relatively heavy upper energized electrode severely complicates the problems of suspension of the electrode in electric isolation within the metal vessel forming the electric treater. The cost and difficulties of constructing sufficiently rigid, imperforate and horizontal upper electrodes can be tolerated in a small diameter (e.g., 12 feet) vertical vessel, or horizontally-elongated vessels of relatively short lengths. Electric treaters have greatly increased in size compared to those manufactured only a decade ago. For example, electric treaters for desalting crude oil have recently been constructed in closed horizontally-elongated vessels having diameters of 10–14 feet and electrode lengths of 90–110 feet. Construction of an imperforate, horizontal upper energized electrode by early designs requires a considerable amount of longitudinal and transverse reinforcing beams supporting relatively thick steel plates. Otherwise, the electrode would not have sufficient rigidity to withstand the torsional and longitudinally bending forces within a horizontal-flow electric treater. Naturally, these electrode structures required an increased number of insulators proportionate to supported weight so that the electrode can be suspended in electrical isolation from the vessel forming the electric treater. The greater the length and width of the imperforate electrode to be energized within the electric treater, the more complex the reinforcement required to provide the necessary rigidity, the greater the supported weight and the larger the number of insulators to suspend such imperforate electrode within the electric treater.

In addition, the installation of such massive electrodes is usually accomplished in the field. All electrode construction materials must be dimensioned to pass through a relatively narrow manway with the ultimate assembly of electrodes being undertaken within the vessel. For example, manways have openings not generally larger than 18 by 24 inches (maximum dimensions) in electrical treaters because of the relatively high pressure conditions encountered in normal field and refinery operations.

It is the purpose of the present invention to provide an electric treater which is arranged for horizontal flow of emulsions within an electric field defined by horizontal electrodes. In particular, the upper electrode is formed of an imperforate thin metal sheeting secured integrally upon transverse arcuate ribs so that the resulting monocoque electrode structure is highly resistant to lateral, longitudinal and vertical bending forces while yet being lightweight but readily assembled by parts passed through the manway of the vessel forming the electric treater.

SUMMARY OF THE INVENTION

In accordance with this invention, there is provided an electric treater for resolving water-in-oil emulsions. The treater comprises a closed horizontally-elongated vessel. An imperforate metal electrode is carried in electrical isolation within the vessel and is positioned horizontally in the vessel and extends substantially the length thereof. An inlet distributor carries flow passages for directing fluid flow in a horizontal path beneath the imperforate electrode and toward the sidewalls of the vessel. A foraminous metallic planar electrode is mounted horizontally in the vessel, and extends substantially the length thereof. The foraminous electrode is positioned at a horizon below the flow passages in the inlet distributor. The imperforate electrode is formed by a plurality of transverse rigid ribs spaced apart the length of the electrode. The ribs have arcuate and straight sections with an imperforate metal sheeting integrally secured to all the ribs, thereby forming arcuate and planar panels extending longitudinally the length of the vessel. The metal sheeting is highly flexible when unsecured to the ribs; however, the metal sheeting when integrally secured to the ribs provides a substantial part of the rigidity of the resulting monocoque electrode structure wherein the imperforate electrode is highly resistant to lateral, longitudinal and vertical bending forces. The imperforate electrode is energized to create an electric field between the imperforate and foraminous electrodes. Inlet means introduce emulsion into the inlet distributor. A body of water is maintained beneath the foraminous electrode. A first outlet means provides for removing water from the vessel, and a second outlet means provides for removing treated oil from the vessel above the imperforate electrode.

DESCRIPTION OF THE DRAWINGS

FIG. 1 is a vertical cross-section of one embodiment of the electric treater of the present invention;

FIG. 2 is a vertical longitudinal section of the electric treater illustrated in FIG. 1, and this section is taken along line 2—2 thereof;

FIG. 3 is a horizontal longitudinal section taken along line 3—3 of the electric treater of FIG. 1; and FIG. 4 is a fragmentary section taken along line 4—4 of the electric treater shown in FIG. 2.

DESCRIPTION OF SPECIFIC EMBODIMENTS

In the drawing, there is shown a preferred embodiment of an electric treater 11 of the present invention. The electric treater 11 is comprised of a horizontally-elongated vessel 12 which is adapted to contain fluids in a liquid phase during the resolution of a water-in-oil emulsion. The terminology "water-in-oil emulsion," as used herein, is intended to include emulsions encountered in connate fluids, such as well production fluids in oil fields, and also in synthetic emulsions created by the dispersion of a water phase within a continuous oil phase, e.g., fresh water dispersed in crude oil or petroleum distillate. This "emulsion" terminology also includes other like systems of a continuous organic liquid phase containing any dispersed aqueous phase.

The vessel 12 usually is insulated for elevated temperature operation. However, insulation is omitted from the electric treater 11 in the drawings to simplify description of the present embodiment. The vessel 12 can be cylindrical with straight sidewalls and closed ends 13 and 14, which ends may be semi-hemispherical in configuration. An imperforate metal electrode 16 is carried in electrical isolation within the vessel 12. For this purpose, the electrode 16 is suspended from the upper portions of the vessel 12 by hanger rods and several insulators 17. The electrode 16 extends substantially the length of the vessel 12 but is spaced from the metal parts thereof. Preferably, the electrode 16 is arranged with a periphery such that a substantially uniform spacing is maintained between the electrode 16, and the sidewalls and ends of the vessel 12. A treated oil zone 18 is formed within the vessel 12 above the imperforate electrode 16. An inlet distributor 19 within the vessel 12 carries flow passages for directing fluid flows in a horizontal path, as illustrated in FIG. 1 by arrows 21 and 22, beneath the imperforate electrode 16 and toward the sidewalls of the vessel 12. The inlet distributor 19 includes a vertical pipe 23 which extends from an emulsion inlet 24 vertically to a horizontal conduit 26 extending longitudinally the length of the vessel 12. The horizontal conduit 26 carries a number of openings 27 which provide the flow passages for directing fluid flow laterally from the horizontal conduit 26 and in a horizontal path beneath the imperforate electrode 16 and toward the sidewalls of the vessel 12. When the vessel 12 is of substantial length, vertical supports 28 and 29 can be employed to support the end extremities of the conduit 26 within the vessel 12.

The openings 27 may take any suitable form but preferably are provided by equal-sized openings positioned at a uniform spacing along the horizontal conduit 26. Preferably, the openings 27 are provided by round holes of equal diameter positioned at a uniform spacing throughout the length of the horizontal conduit 26. Slots and other arrangements of the openings 27 can be used which provide acceptable horizontal flow results in the vessel 12.

Although the horizontal conduit 26 may be constructed of tubular materials, it is preferably of a box-like construction which may be best seen in momentary reference to FIG. 4. The conduit 26 is formed of relatively thin metal sheets formed by welding, bending, etc., into a rectangular cross-sectioned structure having vertical sidewalls 31 and 32 and a flat bottom 33 and top 34. The openings 27 can be provided directly within the sidewalls 31 and 32. However, the openings 27 could be provided by spacing the top 34 a short distance above the sidewalls of the conduit 26 and securing these parts together by welded strap connections. The horizontal conduit 26 is bolted or otherwise connected to the pipe 23 to receive the emulsion from the inlet 24. In addition, the horizontal conduit 26 may be constructed in convenient lengths of 5–10 feet, which are unitized with relatively fluid tight interconnections, e.g., bolted joints, between adjacent sections. Thus, the horizontal conduit 26 may be relatively easily introduced in short sections through a manway in one end of the vessel 12. For example, the end 13 carries a manway 36 providing ready egress into the interior of the vessel 12.

A forminous metallic planar electrode 41 resides horizontally in the vessel 12 and extends substantially the length thereof. The electrode 41 is positioned at a horizon below the openings 27 in the horizontal conduit 26. Any means for mounting the electrode 41 within the vessel 12 can be employed. However, it is advantageous to arrange the electrode 41 for supporting the conduit 26 against a sideway movement during the operation of the electric treater 11. For this purpose, the electrode 41 is formed by horizontal bars 42 and 43 which extend transversely from the sidewalls of the vessel 12 to an interconnection with the conduit 26. The bars 42 and 43 are secured to the vessel 12 by bolting to fillets 44 and 46 welded to the sidewalls of the vessel 12. The horizontal bars 42 and 43, as can be seen in FIG. 4, are secured to the conduit 26 by bolting to angle iron supports 47 and 48 which are carried by sidewalls 31 and 32 of the horizontal conduit 26. A plurality of metal rods 49 are secured to the bars 42 and 43 at substantially equal spacings across the width of the vessel 12. The rods 49 extend substantially the length of the vessel 12. Preferably, the rods 49 extend towards the ends 13 and 14 a short distance beyond the ends of the electrode 16. The foraminous electrode 41 is readily assembled in the vessel 12 from the bar 42 and rods 49 which may be readily passed into the vessel 12. The foraminous electrode 41 is grounded to the vessel 12 to define the electric field's lower extremity beneath the imperforate electrode 16. The foraminous electrode 41 may take other configurations, or have other constructions, as long as it provides a planar ground electrode which is freely traversed by fluid.

The imperforate electrode 56 is formed by a plurality of transverse rigid ribs 51 through 54 and 56 which are spaced apart along the length of the electrode 16. The ribs have at least one arcuate section 57, and straight sections 58 and 59. For example, the ribs can be self-supporting channel members and the desired straight and arcuate sections formed into them with a hydraulic press. Although the arcuate section 57 can take any curved configuration, it is preferred to be a uniform curved configuration, such as hyperbolic or semi-cylindrical, and the latter curved configuration is preferred for purposes of the present electric treater 11.

An imperforate metal sheeting 61 is integrally secured to the ribs 51 through 54 and 56. It will be apparent that the metal sheeting 61 has to conform to the configuration of the ribs. Therefore, the sheeting 61 must be highly flexible when unsecured to the ribs. For example, the sheeting 61 may be a thin material, such as 29-gauge sheet steel. Other thin and highly flexible metal sheeting can be used, if desired. The flexible sheeting can be as long as the electrode 41, but usually will be in lengths more convenient to handle, e.g., 20-foot sections. The metal sheeting 61, as can be seen in FIG. 4, may be provided by a plurality of narrow metal strips 62, 63, and 64 which are integrally secured to the ribs by any suitable means. Bolts 66 with upper and lower straps 67 and 68 can be used to hold the sheeting 61 to the ribs with integral mechanical interconnection and low-resistance electrical contact. The highly flexible nature of the metal sheeting 61 permits it to be rolled crosswise forming an elongated tube which can be passed through the manway 36. Inside the vessel 12, the sheeting 61 is unrolled and secured to the ribs forming the foraminous electrode 16.

The integral mechanical and electrical connection of the sheeting 61 to the ribs forms a monocoque electrode structure which has substantial rigidity in the imperforate electrode 16. The imperforate electrode 16 resembles aircraft construction in which the outer covering of relatively thin and flexible skin carries all or a major part of the stresses. The ribs provide a transverse support of a non-planar configuration in the imperforate electrode 16 which is highly resistant to torsional bending forces. The addition of the sheeting 61 in the construction of the imperforate electrode 16 produces a very lightweight imperforate electrode which can be suspended upon a minimum number of insulators 17. The insulators 17 are secured by hanger rods to the ribs of the imperforate electrode 16. The sheeting 61, although relatively thin and highly flexible, provides the desired rigidity for preventing lateral, vertical and longitudinal bending of the imperforate electrode 16.

The sheeting 61 can be formed of a plurality of narrow metal strips 62, 63, and 64, etc., to completely cover the ribs of the electrode 16. Although flat metal sheeting can be employed, it is preferred that the sheeting 61 have an undulated hyperbolic configuration as is shown in FIG. 4. For example, the sheeting 61 can be suitable lengths of corrugated iron, such as commonly used for roofing in commercial and farm biuldings. Corrugated iron has been found extremely suitable for the purposes of this invention since it can be obtained in lengths up to 20 feet and widths varying from 26 to 50 inches. These widths permit an overlapping (indicated by numeral 65) forming relatively fluid tight joints. The highly flexible nature of the corrugated iron permits it to be rolled into an elongated tube-like member which can be passed through the manway 36. Then, the rolled tube is opened and the sheeting is readily installed by bolts and straps upon the ribs suspended from the insulators 17 within the vessel 12. The use of corrugated iron for the sheeting 61 provides several additional advantageous functions in the electric treater 11. The longitudinally extending ridges and valleys in the sheeting 61 provide for carrying any accumulated water and solids, or other deleterious materials, which materials might fall upon it from the treated oil zone 18 to the ends of electrode 16. These materials are then discharged downwardly and toward the ends of the vessel 12. Thus, no substantial amounts of water or other deleterious material can accumulate on top of the imperforate electrode 16 to bend or otherwise overload the structure. In addition, the horizontal flow of emulsion between the imperforate electrode 16 and the foraminous electrode 41 passes crosswise across the undulated configuration of the sheeting 61. This provides turbulence for preventing laminar flows in the emulsion which might carry coalesced but entrapped water into the treated oil zone 18.

The arcuate section 57 in the ribs is preferably semi-hemispherical in configuration. Preferably, the configuration of the arcuate section 57 in the ribs is so arranged that the sheeting 61 is spaced substantially equi-distantly above the horizontal conduit 26 throughout the length of the imperforate electrode 16. In addition, this spacing is preferably the same dimension as the vertical spacing between the electrodes 16 and 41. Thus, the electric field provided by energization of the electrode 16 is of substantially uniform gradient throughout the horizontal extent of the electric field between these electrodes.

The imperforate electrode 16 is energized by any suitable means. For example, the electrode 16 can be energized with high potential a.c. current provided by a transformer 71 having a primary 72 connected to a suitable source of power and a high potential secondary 73 connected at one terminal to the vessel 12 and the other terminal connected through an insulated conduit 74 to an entrance bushing 76 which carries a lower connection to a flexible lead 77 connected with rib 54. Thus, high potential current is passed through the metal sidewalls of the vessel 12 for energizing the imperforate electrode 16 relative to the foraminous grounded electrode 41, and the sidewalls of the vessel 12. Although it is preferred to energize the imperforate electrode 16 with alternating current, unidirectional potentials may be employed, if desired.

Treated (dehydrated) oil is removed from the treated oil zone 18 through an outlet 78 connecting to a treated oil line 79 which usually carries a backpressure valve (not shown) for insuring that the contents of the vessel 12 remain in the liquid state during the electric field resolution of the emulsion passing through the distributor 19. During operation of the electric treater 11, a body of water 81 accumulates within the lower portion of the vessel 12. The body of water 81 is maintained beneath the foraminous electrode 41. Preferably, the upper horizon 82 (oil-water interface) of the body of water 81 remains below the foraminous electrode 41 a distance equal to the spacing between the electrodes 16 and 41. The body of water 81 is maintained with the upper horizon 82 below the foraminous electrode 41 by any suitable means. For example, the vessel 12 carries a water outlet 83 connected to a water drain-off conduit 84 which includes a motor valve 86. The motor valve 86 is actuated by a level controller 87 through an interconnection indicated by chain line 85. The level controller 87 may be of any suitable construction which detects the horizon 82 and can be actuated by a float 88. Thus, the horizon 82 in the lower portion of the vessel 12 moves vertically from a set level and the float 88 responsively actuates the motor valve 86 to regulate the flow of water passing through the water outlet conduit 84. Thus, the body of water 81 is maintained at any desired preset level within the lower portion of the vessel 12.

The ribs 51 through 54 and 56 may have a plurality of alternate straight and arcuate sections. However, it is preferred that the ribs have end sections 58 and 59 which are straight and positioned in the horizontal to provide a planar surface parallel to the horizontally oriented foraminous electrode 41 in the vessel 12. By this arrangement, the energized imperforate electrode 16 and the grounded foraminous electrode 41 are maintained at a uniform vertical spacing throughout the extent of the vessel 12. The imperforate electrode 16 with straight sections and arcuate sections having an upwardly flexed curvature provide the best structure with great rigidity, but yet lightweight, in construction of the electric treater 11 of the present invention.

Various modifications and alterations in the described electric treater will be apparent to those skilled in the art from the foregoing description. For this reason, changes which do not depart from the spirit of the invention are intended to be included within the scope of the appended claims. The appended claims define the present invention; and the foregoing description is to be employed for setting forth the present embodiment as illustrative in nature.

What is claimed is:

1. An electric treater for resolving water-in-oil emulsions, said treater comprising:
   (a) a closed horizontally-elongated vessel;
   (b) an imperforate metal electrode carried in electrical isolation from said vessel, said imperforate electrode positioned horizontally in said vessel and extending substantially the length thereof;
   (c) an inlet distributor carrying means forming flow passages for directing fluid flows in a horizontal path beneath said imperforate electrode and toward the sidewalls of said vessel;
   (d) a foraminous metallic planar electrode mounted horizontally in said vessel and extending substantially the length thereof, and said foraminous electrode positioned at a horizon below said flow passages in said inlet distributor;
   (e) said imperforate electrode formed by a plurality of transverse rigid ribs spaced apart the length thereof, said ribs having arcuate and straight sections with an imperforate metal sheeting integrally secured to said ribs thereby forming arcuate and planar panels extending longitudinally the length of said vessel, said metal sheeting being highly flexible when unsecured to said ribs and said metal sheeting when integrally secured to said ribs providing a substantial part of the rigidity of the resulting monocoque electrode structure wherein said imperforate electrode is highly resistant to lateral, longitudinal and vertical bending forces;
   (f) means for energizing said imperforate electrode to create an electrical field between said imperforate and foraminous electrodes;
   (g) inlet means for introducing emulsion into said inlet distributor;
   (h) means for maintaining a body of water beneath said foraminous electrode;
   (i) first outlet means for removing water from said vessel; and
   (j) second outlet means for removing treated oil from the vessel above said imperforate electrode.

2. The electric treater of claim 1 wherein said imperforate electrode has a central arcuate panel and planar side panels with said side panels positioned horizontally in said vessel and said arcuate panel extending longitudinally the length of said imperforate electrode.

3. The electric treater of claim 2 wherein said central arcuate panel has a semi-cylindrical cross-section with an upwardly flexed curvature.

4. The electric treater of claim 3 wherein said inlet distributor includes a horizontal conduit extending longitudinally in said vessel, and said horizontal conduit carrying said flow passages.

5. The electric treater of claim 4 wherein said foraminous electrode is secured to the sidewalls of said vessel and said horizontal conduit.

6. The electric treater of claim 1 wherein said imperforate metal sheeting has an undulating configuration transverse to its longitudinal dimension.

7. The electric treater of claim 6 wherein said imperforate metal sheeting is corrugated iron.

8. The electric treater of claim 1 wherein said ribs are formed into the configurations of said arcuate and planar panels from self-supporting channel members.

9. An electric treater for resolving water-in-oil emulsions, said treater comprising:
   (a) a closed horizontally-elongated vessel;
   (b) an imperforate metal electrode carried in electrical isolation from said vessel, said imperforate electrode positioned in the horizontal in said vessel and extending substantially the length thereof with a substantially uniform spacing between the periphery of said imperforate electrode and the sidewalls and ends of said vessel;
   (c) an inlet distributor including a horizontal conduit extending longitudinally the length of said vessel at a uniform lateral spacing from the sidewalls of said vessel, said horizontal conduit carrying flow passages for directing fluid flows laterrally from said horizontal conduit and in a horizontal path beneath said imperforate electrode and toward the sidewalls of said vessel;
   (d) a foraminous metallic planar electrode mounted horizontally in said vessel and extending substantially the length thereof, and said planar electrode positioned at a horizon below said flow passages in said horizontal conduit and secured to the sidewalls of said vessel;
   (e) said imperforate electrode having a central longitudinally extending semi-cylindrical panel with planar panels extending laterally therefrom at a uniform vertical spacing from said foraminous electrode, said semi-cylindrical panel having an upwardly flexed curvature for maintaining an equidistant spacing from said horizontal inlet distributor of substantially the same dimension as the vertical spacing between said planar panels of said imperforate electrode and said foraminous electrode, and said panels formed of a thin metal sheeting integrally secured to transverse rigid metal ribs;
   (f) means for energizing said imperforate electrode to create an electrical field between said imperforate and foraminous electrodes;
   (g) inlet means for introducing emulsion into said inlet distributor;
   (h) means for maintaining a body of water whose upper surface is at a horizon below said foraminous electrode;
   (i) first outlet means for removing water at a regulated rate from said vessel; and
   (j) second outlet means for removing treated oil from the vessel above said imperforate electrode.

10. The electric treater of claim 9 wherein a plurality of vertical supports extend between said horizontal conduit and said vessel.

11. The electric treater of claim 10 wherein said foraminous electrode integrally connects to said horizontal conduit thereby providing lateral support of said horizontal conduit relative to said vessel.

12. The electric treater of claim 9 wherein said imperforate electrode is formed of a plurality of narrow strips of metal sheeting extending longitudinally in said vessel, and said metal sheeting is secured upon transverse rigid metal ribs forming the desired configuration of said central semi-cylindrical panel and said planar panels into a monocoque structure, and insulator means supporting from said ribs said imperforate electrode in electrical isolation from said vessel.

13. The electric treater of claim 9 wherein said metal sheeting has an undulating configuration transverse to its longitudinal dimension.

14. The electric treater of claim 9 wherein said metal sheeting is corrugated iron.

15. The electric treater of claim 9 wherein said flow passages introduce fluid at a horizon equidistant from said imperforate and foraminous electrodes.

16. The electric treater of claim 9 wherein said flow passages are equal-sized round holes positioned at a uniform spacing along said horizontal conduit.

17. The electric treater of claim 9 wherein said foraminous electrode has end portions spaced inwardly of said imperforate electrode at the ends of said vessel.

18. The electric treater of claim 9 wherein said horizontal conduit has a rectangular cross-section and said flow passages are positioned adjacent the upper extremity of said horizontal conduit.

19. The electric treater of claim 18 wherein said flow passages are equal-sized openings positioned at a uniform spacing along said horizontal conduit.

References Cited

UNITED STATES PATENTS

| | | | |
|---|---|---|---|
| 2,527,690 | 10/1950 | Turner | 204—302 |
| 2,894,895 | 7/1959 | Turner | 204—302 |
| 2,848,412 | 8/1958 | Easley | 204—302 |
| 2,963,414 | 12/1960 | Waterman | 204—302 |
| 3,540,994 | 11/1970 | Napier | 204—302 |

FOREIGN PATENTS

| | | | |
|---|---|---|---|
| 709,626 | 6/1954 | Great Britain | 204—302 |

T. M. FARIELLO, Primary Examiner